United States Patent
Bell et al.

(10) Patent No.: US 10,910,926 B2
(45) Date of Patent: Feb. 2, 2021

(54) METHOD FOR REPAIRING GENERATOR STATOR CORE

(71) Applicant: Siemens Energy, Inc., Orlando, FL (US)

(72) Inventors: Shane Bell, Chuluota, FL (US); Randy Edward Whitener, Chuluota, FL (US); Alejandro Felix, Oviedo, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 342 days.

(21) Appl. No.: 15/994,043

(22) Filed: May 31, 2018

(65) Prior Publication Data

US 2019/0372436 A1 Dec. 5, 2019

(51) Int. Cl.
| | |
|---|---|
| *H02K 15/00* | (2006.01) |
| *H02K 11/20* | (2016.01) |
| *H02K 1/16* | (2006.01) |
| *H02K 1/20* | (2006.01) |
| *H02K 15/02* | (2006.01) |
| *H02K 15/10* | (2006.01) |

(52) U.S. Cl.
CPC ........... *H02K 15/0006* (2013.01); *H02K 1/16* (2013.01); *H02K 1/20* (2013.01); *H02K 11/20* (2016.01); *H02K 15/024* (2013.01); *H02K 15/10* (2013.01); *Y10T 29/49009* (2015.01)

(58) Field of Classification Search
USPC .................. 29/596, 402.01, 598, 604, 609
See application file for complete search history.

(56) References Cited

U.S. PATENT DOCUMENTS

| | | | | |
|---|---|---|---|---|
| 4,362,960 A | * | 12/1982 | Gillet | .............. H02K 1/20 310/57 |
| 6,583,526 B2 | | 6/2003 | Griffith et al. | |
| 9,013,075 B2 | * | 4/2015 | Graman | .............. H02K 1/32 310/59 |

FOREIGN PATENT DOCUMENTS

| | | |
|---|---|---|
| EP | 1786087 A1 | 5/2007 |
| EP | 2765684 A2 | 8/2014 |

OTHER PUBLICATIONS

Anonymous Ed—Anonymous, "IEEE guide for insulation maintenance of large alternating-current rotating machinery (10,000 kVA and larger)", Mar. 15, 1977 (Mar. 15, 1977), IEEE Standard, [IEEE Standard], IEEE, Piscataway, NJ, USA, XP017600799 / Mar. 15, 1977.

(Continued)

*Primary Examiner* — Thiem D Phan

(57) ABSTRACT

A method for repairing a stator core of a generator is presented. The stator core includes laminations grouped into packs. A ventilation spacer is disposed between adjacent packs. Laminations are separated from each other by insulation layers. The ventilation spacer is removed between adjacent packs having a damaged insulation layer between the laminations to locally loosen the laminations in the adjacent packs which allows the damaged insulation layer between the laminations to be repaired. A new ventilation spacer is reinstalled between the adjacent packs where the ventilation spacer being removed to retighten the laminations in the adjacent packs after completion of the repair. The new ventilation spacer is adhesively secured between the adjacent packs.

12 Claims, 3 Drawing Sheets

(56) References Cited

OTHER PUBLICATIONS

Chuck Yung Ed—John Propst et al: "A New Method for Stator Core Repair Reduces Core Losses and Repair Time", Petroleum and Chemical Industry Conference, 2006, Industry Applications Society 53rd Annual, IEEE, PI, Sep. 1, 2006 (Sep. 1, 2006), pp. 1-10, XP031087710 / Sep. 1, 2006.
PCT International Search Report and Written Opinion dated Jul. 24, 2019 corresponding to PCT Application No. PCT/US2019/032571 filed May 16, 2019.

* cited by examiner

METHOD FOR REPAIRING GENERATOR STATOR CORE

TECHNICAL FIELD

The present invention relates generally to a method for repairing a stator core of a generator.

DESCRIPTION OF RELATED ART

A generator is a component in power generation industry that converts mechanical power to electrical power. A generator typically includes a stator and a rotor. A generator stator may employ a stator core comprised a plurality of axially extending slots along an internal circumference of the stator core. Stator windings are placed in the slots with insulation from the stator core. A rotor may be installed within the stator core.

A stator core may consist of a plurality of packs of stacked thin metal laminations. The laminations are insulated from each other by a very thin dielectric. The laminations direct magnetic flux around the stator core. If a number of laminations short together such that a loop can be established around the magnetic flux, then current will flow in that loop generating heat. Shorting of laminations may occur very often due to foreign objects which may damage insulations between the laminations and smear the laminations together or may provide a path by connecting adjacent laminations with a conductive material. Other modes of lamination to lamination shorting may occur due to excessive heat from various sources affecting the dielectric coating. Damaged insulations between laminations may result in higher eddy current and a higher local temperature, also known as a local hot spot, between several laminations. The damage may spread out along the stator core over time and may cause damage of the generator. It is recommended to regularly check the stator core and to repair the damaged insulations of the stator core to avoid possible consequential damages of the generator.

Conventionally, a process for repairing insulations between generator stator core laminations requires extensive steps to loosen the stator core, or substantial disassembly including removing and rewinding stator windings. There is a need to provide an easy process for repairing the insulations between generator stator core laminations.

SUMMARY OF INVENTION

Briefly described, aspects of the present invention relate to a method for repairing a stator core of a generator, a stator core of a generator, and a method for servicing a stator core of a generator.

According to an aspect, a method for repairing a stator core of a generator is presented. The stator core comprises a plurality of laminations grouped into a plurality of packs. Each pack comprises multiple laminations separated from each other by an insulation layer. A ventilation spacer is disposed between adjacent packs. The method comprises removing a ventilation spacer between adjacent packs comprising a damaged insulation layer between the laminations for locally loosening the laminations in the adjacent packs. The method comprises repairing the damaged insulation layer between the laminations in the adjacent packs. The method comprises reinstalling a new ventilation spacer between the adjacent packs where the ventilation spacer being removed for retightening the laminations in the adjacent packs after completion of the repair.

According to an aspect, a stator core of a generator is presented. The stator core comprises a plurality of laminations grouped into a plurality of packs. The stator core comprises a ventilation spacer disposed between adjacent packs. The stator core comprises an insulation layer disposed between the laminations in each pack. The ventilation spacer is configured to be removed between adjacent packs comprising a damaged insulation layer between the laminations for locally loosening the laminations in the adjacent packs to enable a repair of the damaged insulation layer in the adjacent packs. A new ventilation spacer is configured to be reinstalled between the adjacent packs where the ventilation spacer being removed for retightening the laminations in the adjacent packs after completion of the repair.

According to an aspect, a method for servicing a stator core of a generator is presented. The stator core comprises a plurality of laminations grouped into a plurality of packs. Each pack comprises multiple laminations separated from each other by an insulation layer. A ventilation spacer is disposed between adjacent packs. The method comprises performing a test to the stator core for detecting a damaged insulation layer between the laminations. The method comprises removing the ventilation spacer between adjacent packs comprising the damaged insulation layer between the laminations for locally loosening the laminations in the adjacent packs. The method comprises repairing the damaged insulation layer between the laminations in the adjacent packs. The method comprises reinstalling a new ventilation spacer between the adjacent packs where the ventilation spacer being removed for retightening the laminations in the adjacent packs after completion of the repair.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
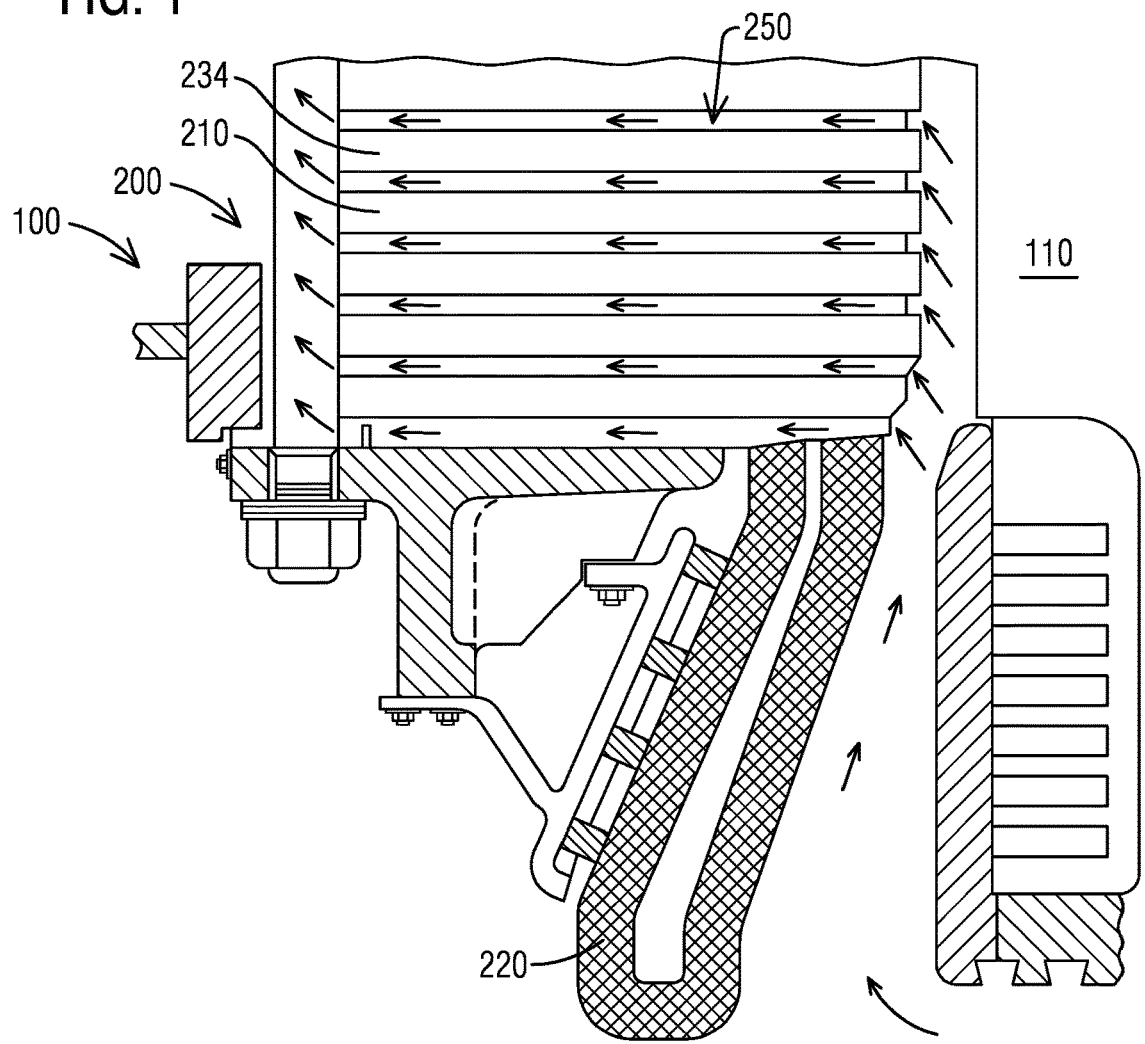
FIG. 1 illustrates a schematic partial cross section view of a generator in which embodiments of the present invention may be implemented.

FIG. 1 illustrates a schematic partial cross section view of a generator 100. The generator 100 includes a rotor 110 and a stator 200. The stator 200 has a stator core 210. The rotor 110 is installed within the stator core 210. A stator winding 220 may be arranged within the stator core 210.

The stator core 210 may be comprised of a plurality of packs 234 of stacked thin metal laminations 230. Each pack 234 includes multiple laminations 230 which are shown in more detail in FIG. 2. The stator core 200 may be cooled by a plurality of ventilation ducts 250 radially oriented between adjacent packs 234. The ventilation ducts 250 may be formed by ventilation spacers 260 which are shown in more detail in FIG. 3. The ventilation spacers 260 are disposed on the last lamination 230 in each pack 234 and are in contact with a surface of a lamination 230 in an adjacent pack 234 facing to the ventilation ducts 250. The ventilation spacers 260 may be secured to the lamination 230 to prevent the ventilation spacers 260 from moving. The ventilation spacers 260 may be secured to the lamination 230 by any suitable manners, such as by being spot welded to the lamination 230, by being pressed into holes in the lamination 230, or by being nailed to the lamination 230. The ventilation spacers 260 may tighten and provide support to the laminations 230 in adjacent packs 234 to prevent vibration of the laminations 230. The ventilation spacers 260 may include any suitable materials, such as metals, carbon steel, etc.

Figure 2:
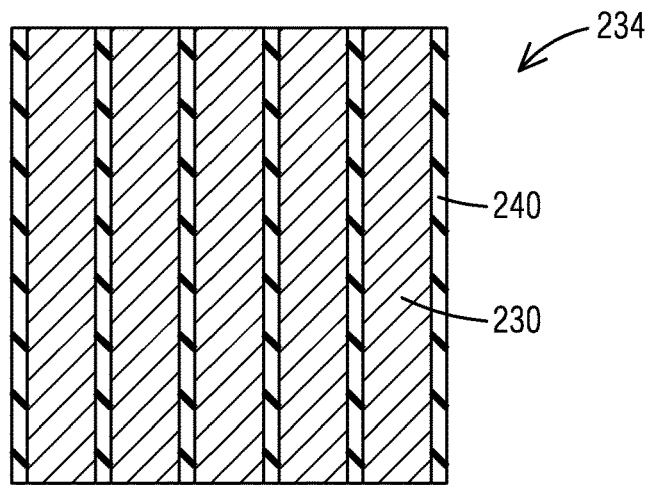
FIG. 2 illustrates a schematic cross section view of a lamination pack in which embodiments of the present invention may be implemented.

FIG. 2 illustrates a schematic cross section view of a pack 234 having a plurality of laminations 230. As shown in FIG. 2, the laminations 230 are separated from each other by an insulation layer 240. The insulation layer 240 may include any suitable materials, such as insulation paper, fiber glasses, etc. The insulation layer 240 is much thinner than the lamination 230. For example, the lamination 230 may have a thickness in an order of millimeters. The insulation layer 240 may have a thickness in an order of micrometers.

During generator operation, the insulation layers 240 between the laminations 230 may be damaged by various reasons, such as excessive heat, or foreign objects, etc. Damaged insulation layers 240 may result in hot spots between the laminations 230. The hot spots may further damage the insulation layers 240. The damage may spread out along the stator core 210 over time and may cause damage of the generator 100. Repair of damaged insulation layers 240 is necessary to prevent damage of the generator 100. However, due to tightness of laminations 230 in each pack 234, repair of the damaged insulation layers 240 between the laminations 230 may require extensive steps to loosen the laminations 230 in each pack 234, or to remove the stator winding 220 before repair and rewinding the stator winding 220 after completion of repair.

Figure 3:
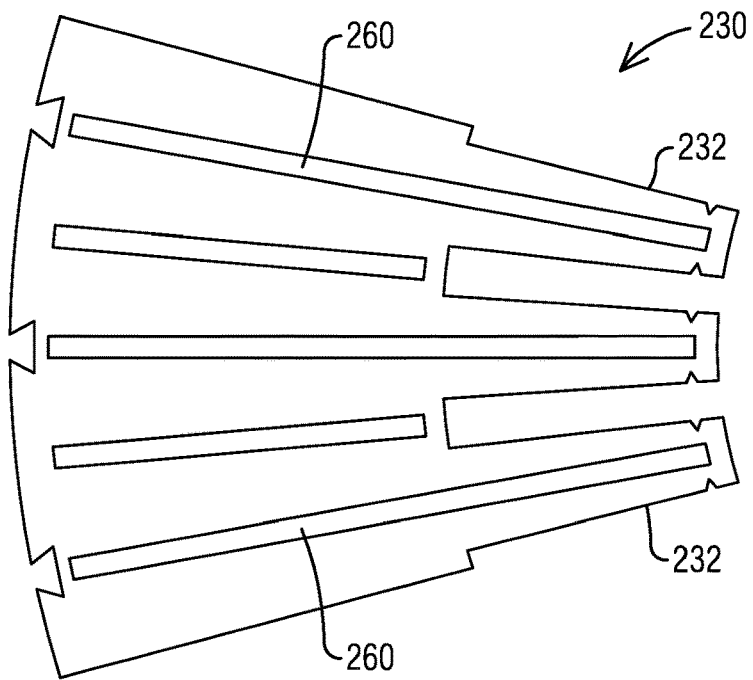
FIG. 3 illustrates a schematic plan view of a lamination having ventilation spacers of which embodiments of the present invention may be implemented.

FIG. 3 illustrates a schematic plan view of a last lamination 230 in a pack 234. As shown in FIG. 3, an inner portion of the lamination 230 has a tooth shape comprised of a plurality of tooth 232. Typically, damage of the insulations layers 240 occurs near the tooth 232 of the laminations 230. The ventilation spacers 260 are disposed on a surface of the lamination 230 facing to the ventilation duct 250. The ventilation spacers 260 may have a block rail shape and are radially oriented. The ventilation spacers 260 are in contact with a surface of a lamination 230 of an adjacent pack 234 facing to the ventilation duct 250. The ventilation spacers 260 may tighten the laminations 230 in the adjacent packs 234. Removal of the ventilation spacers 260 may locally loosen the laminations 230 in the adjacent packs 234 so that damaged insulation layers 240 between the laminations 230 in the adjacent packs 234 may be repaired. The repair may include reapplying insulation layers 240 between the laminations 230 where the damages occur. The ventilation spacers 260 are removed radially from the tooth 232 to a radial location corresponding to a dimension of the damaged insulation layer 240, such as a radial length of the damaged insulation layer 240. The ventilation spacers 260 may be removed by any suitable manners, such as by machining away.

Figure 4:
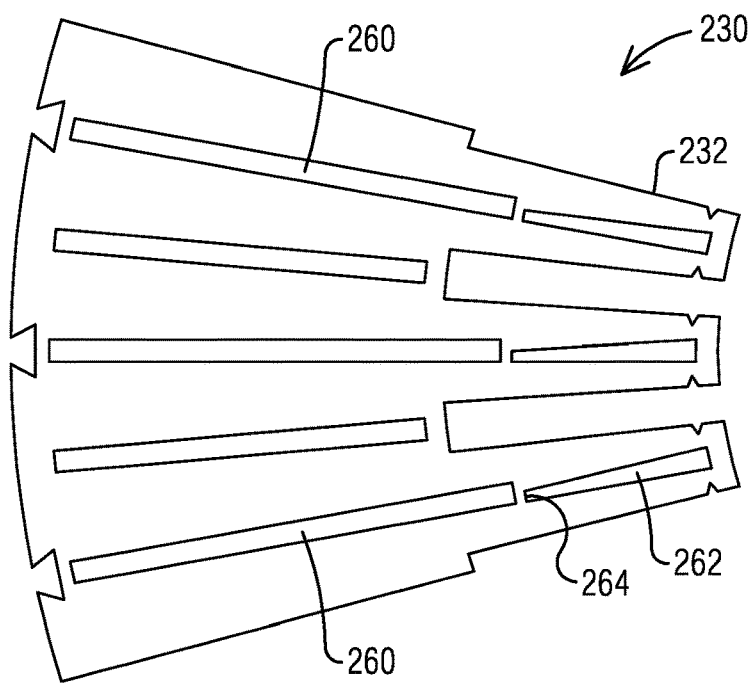
FIG. 4 illustrates a schematic plan view of a lamination having new ventilation spacers according to an embodiment of the present invention.

After completion of the repair, new ventilation spacers 262 are reinstalled back to areas where the ventilation spacers 260 are removed. FIG. 4 illustrates a schematic plan view of a last lamination 230 having reinstalled new ventilation spacers 262. As shown in FIG. 4, a portion of ventilation spacers 260 are removed prior to repair. New ventilation spacers 262 are reinstalled between adjacent packs 234 back to areas where the ventilation spacers 260 are removed after completion of the repair. The reinstalled new ventilation spacers 262 retighten the loosen laminations 230 in the adjacent packs 234. The new ventilation spacers 262 may have a block rail shape. The new ventilation spacers 262 may have a tapered shape for easy reinstallation. Tapered tips 264 of the new ventilation spacers 262 are inserted toward to the remaining portion of the ventilation spacers 260. A radial length of the new ventilation spacers 262 may be equal to or less than a radial length of the ventilation spacers 260 being removed. For illustration purpose as shown in FIG. 4, a radial length of the new ventilation spacers 262 is less than a radial length of the ventilation spacers 260 being removed so that the tapered tips 264 of the new ventilation spacers 262 are not in contact with the remaining portion of the ventilation spacers 260. It is understood that a radial length of the new ventilation spacers 262 may be equal to a radial length of the ventilation spacers 260 being removed so that the tapered tips 264 of the new ventilation spacers 262 are in contact with the remaining portion of the ventilation spacers 260. It is also understood that tapered tips 264 of some of the new ventilation spacers 262 may be in contact with the remaining portion of the ventilation spacers 260 and tapered tips 264 of some of the new ventilation spacers 262 may be not in contact with the remaining portion of the ventilation spacer 260. The new ventilation spacers 262 may include polymer plastic materials, epoxy composite resins, such as G-11 fiber glass. The new ventilation spacers 262 may be adhesively secured between the adjacent packs 234. For example, the new ventilation spacers 262 may be coated with glue prior to reinstallation. Alternatively, areas between the adjacent packs 234 where the ventilation spacers 260 being removed are coated with glue prior to reinstalling the new ventilation spacers 262. The glue may include any suitable glue materials, such as Dacron™, or Nomex™.

Figure 5:
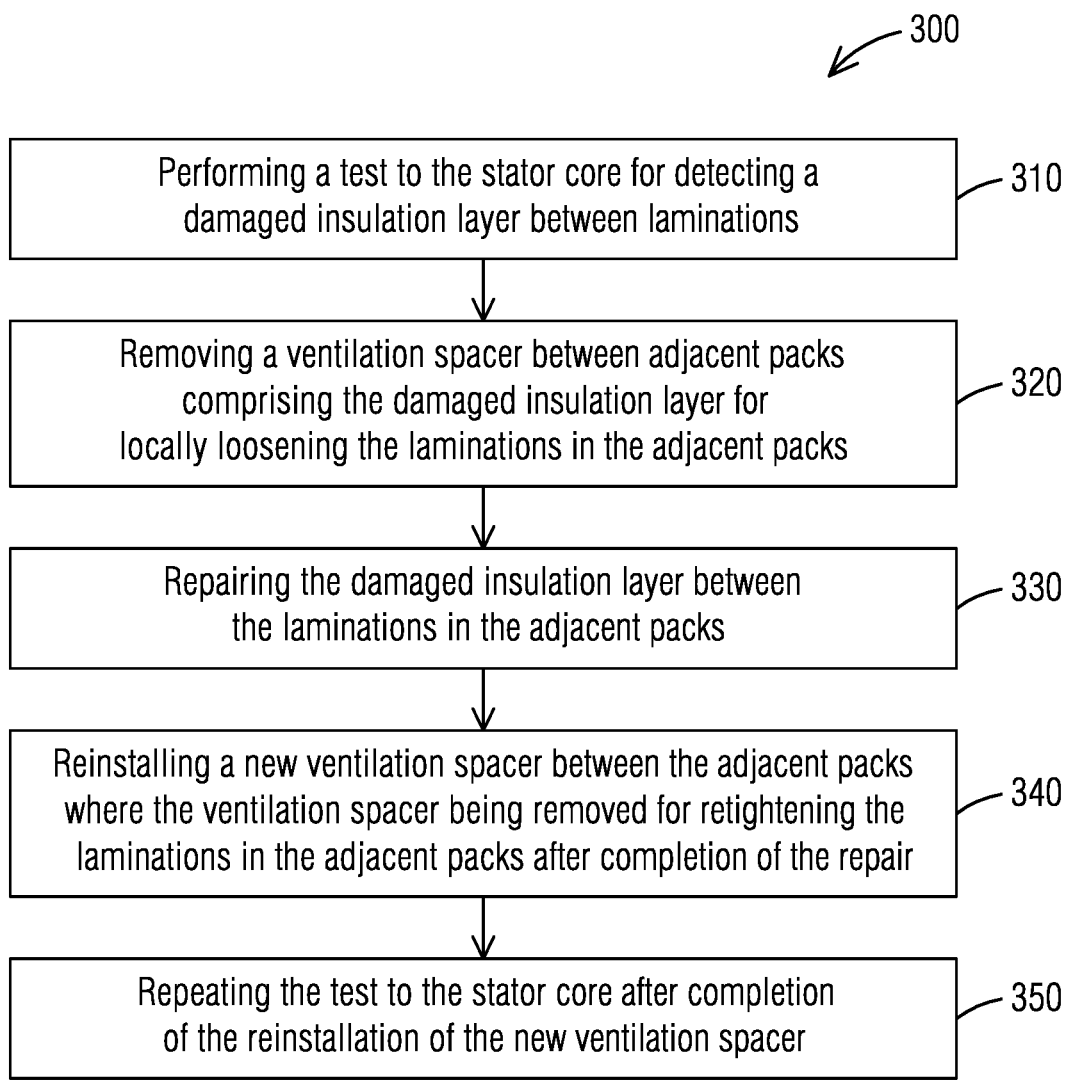
FIG. 5 illustrates a schematic process flow chart for repairing a stator core of a generator according to an embodiment of the present invention.

FIG. 5 is a schematic process flow chart 300 for repairing insulation layers 240 between laminations 230 of a stator core 210 of a generator 100 according to embodiments of the present invention. In step 310, a test to the stator core 210 may be performed for detecting a damaged insulation layer 240 between the laminations 230. The test may include any suitable tests known in the industry, such as a loop test. In step 320, a ventilation spacer 260 between adjacent packs 234 including the damaged insulation layer 240 is removed. The laminations 230 in the adjacent packs 234 are thus locally loosened. In step 330, the damaged insulation layer 240 between the laminations 230 in the adjacent packs 234 is repaired. In step 340, after completion of the repair, a new ventilation spacer 262 is reinstalled between the adjacent packs 234 where the ventilation spacer 260 being removed. The laminations 230 in the adjacent packs 234 are thus retightened. In step 350, the test to the stator core 210 may be repeated after completion of the reinstallation of the new ventilation spacer 262 to ensure the damaged insulation layer 240 is properly repaired.

According to an aspect, the proposed method provides an easy process for repairing insulation layers 240 between laminations 230 of a stator core 210 of a generator 100. The proposed method only locally loosens the laminations 230 in adjacent packs 234 having a damaged insulation layer 240 by removing ventilation spacers 260 between the adjacent packs 234 which allows the damaged insulation layers 240 to be repaired. New ventialtion spacers 262 are reinstalled back to the areas where the ventilation spacers 260 are removed after completion of repair to retighten the laminations 230 in the adjacent packs 234. The new ventilation spacers 262 may be adhesively secured in place, such as by glues.

According to an aspect, the proposed method provides an easy process for repairing a damaged insulation layers 240 between the laminations 230 of a stator core 210 of a generator 100 without loosening the stator core 210, or when loosening the stator core 210 is not possible. The proposed method eliminates a need to substantially dissemble and reassemble the stator core 210 for repairing the damaged insulation layers 240 between the laminations 230. The proposed method provides significantly cost savings and significantly increase efficiency for maintenance of a generator 100. The proposed method significantly increases operation life of a generator 100.

According to an aspect, the proposed method may be applied to a radially cooled generator stator core 210.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator
110: Rotor
200: Stator
210: Stator Core
220: Stator Winding
230: Lamination
232: Lamination Tooth
234: Pack of Laminations
240: Insulation Layer
250: Ventilation Duct
260: Ventilation Spacer
262: New Ventilation Spacer
264: Tapered Tip of New Ventilation Spacer
300: Process Flow Chart

What is claimed is:

1. A method for repairing a stator core of a generator, wherein the stator core comprises a plurality of laminations grouped into a plurality of packs, wherein each pack comprises multiple laminations separated from each other by an insulation layer, wherein a ventilation spacer is disposed between adjacent packs, the method comprising:
   removing a ventilation spacer between adjacent packs comprising a damaged insulation layer between the laminations for locally loosening the laminations in the adjacent packs;
   repairing the damaged insulation layer between the laminations in the adjacent packs; and
   reinstalling a new ventilation spacer between the adjacent packs where the ventilation spacer being removed for retightening the laminations in the adjacent packs after completion of the repair.

2. The method as claimed in claim 1, wherein the ventilation spacer is removed from a tooth of the lamination to a radial location corresponding to a dimension of the damaged insulation layer.

3. The method as claimed in claim 1, wherein the ventilation spacer is removed by machining away.

4. The method as claimed in claim 1, wherein the new ventilation spacer comprises a block rail shape.

5. The method as claimed in claim 1, wherein the new ventilation spacer comprises a tapered shape.

6. The method as claimed in claim 1, wherein the new ventilation spacer is coated with glue prior to reinstallation.

7. The method as claimed in claim 1, wherein an area between the adjacent packs where the ventilation spacer being removed is coated with glue prior to reinstalling the new ventilation spacer.

8. The method as claimed in claim 1, wherein the new ventilation spacer comprises an epoxy resin.

9. The method as claimed in claim 1, further comprising performing a test to the stator core for detecting the damaged insulation layer between the laminations prior to removing the ventilation spacer.

10. The method as claimed in claim 1, further comprising performing a test to the stator core after completion of the reinstallation of the new ventilation spacer.

11. A method for servicing a stator core of a generator, wherein the stator core comprises a plurality of laminations grouped into a plurality of packs, wherein each pack comprises multiple laminations separated from each other by an insulation layer, wherein a ventilation spacer is disposed between adjacent packs, the method comprising:
   performing a test to the stator core for detecting a damaged insulation layer between the laminations;
   removing a ventilation spacer between adjacent packs comprising the damaged insulation layer between the laminations for locally loosening the laminations in the adjacent packs;
   repairing the damaged insulation layer between the laminations in the adjacent packs; and
   reinstalling a new ventilation spacer between the adjacent packs where the ventilation spacer being removed for retightening the laminations in the adjacent packs after completion of the repair.

12. The method as claimed in claim 11, further comprising repeating the test to the stator core after completion of the reinstallation of the new ventilation spacer.

* * * * *